R. S. ARRANTS.
CIRCULAR MULTIPLE MACHINE TABLE.
APPLICATION FILED DEC. 9, 1916.

1,243,577.

Patented Oct. 16, 1917

WITNESSES

INVENTOR
R. S. Arrants
BY
ATTORNEYS

UNITED STATES PATENT OFFICE.

ROBERT S. ARRANTS, OF KINGSPORT, TENNESSEE.

CIRCULAR MULTIPLE MACHINE-TABLE.

1,243,577.   Specification of Letters Patent.   Patented Oct. 16, 1917.

Application filed December 9, 1916. Serial No. 135,972.

*To all whom it may concern:*

Be it known that I, ROBERT S. ARRANTS, a citizen of the United States, and a resident of Kingsport, in the county of Sullivan and State of Tennessee, have invented a new and Improved Circular Multiple Machine-Table, of which the following is a full, clear, and exact description.

This invention relates to machine shop apparatus and has particular reference to work-holding means in the form of a movable table or circular series of associated individual work-supporting tables movable step by step successively before any suitable number of machines operated also in series along the series of tables.

Among the objects of the invention is to simplify and expedite the operation of applying the work to the several table units, as well as the removal of the same from such units, the table units, however, continuing always in the same path or line of action.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Referring now more particularly to the drawings, I show a substantially circular supporting structure indicated as a whole at 10, the same comprising a circular series of machine supports or stands 11, shown in this instance as eight in number, each stand being adapted to hold a power-operated machine, such as is indicated at 12. These machines 12 may be of any desired nature and may be individually operated by any suitable power connections which have no immediate bearing upon this invention and hence are not illustrated.

Figure 1:
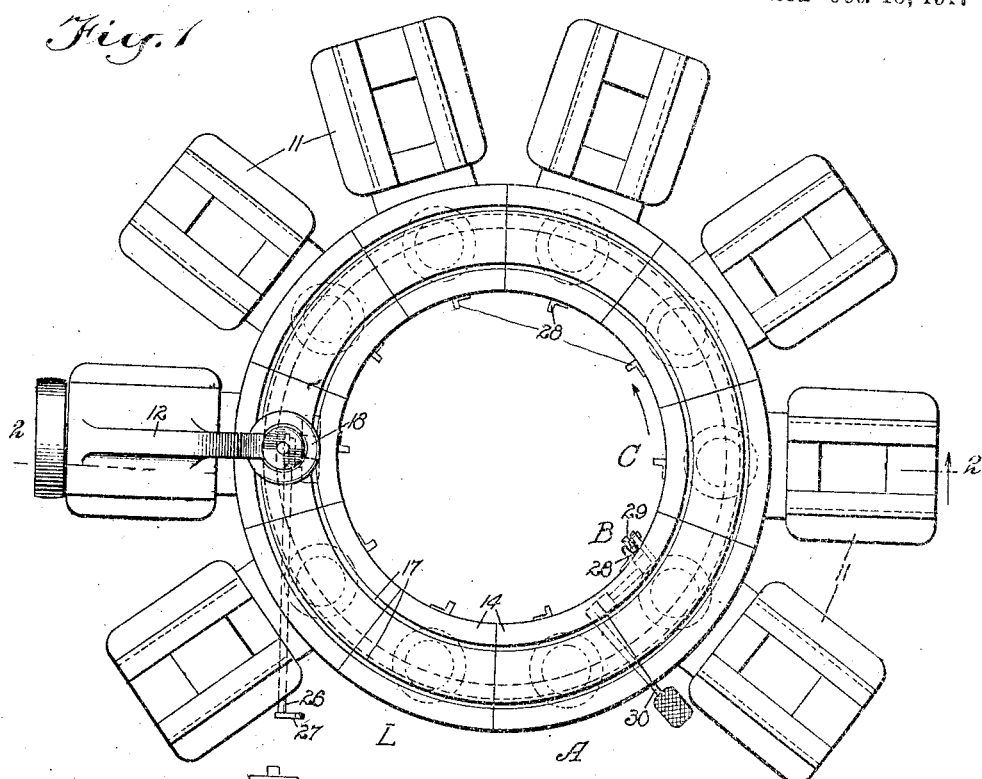
Figure 1 is a plan view of the improved multiple table indicating diagrammatically its relation to the stationary machine supports, both the table and the machine supports being arranged in parallel circular series.
Figure 3:
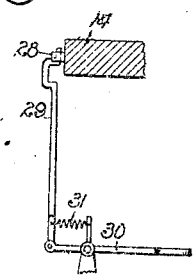
Fig. 3 is a detail view of the stopping device.
Figure 2:
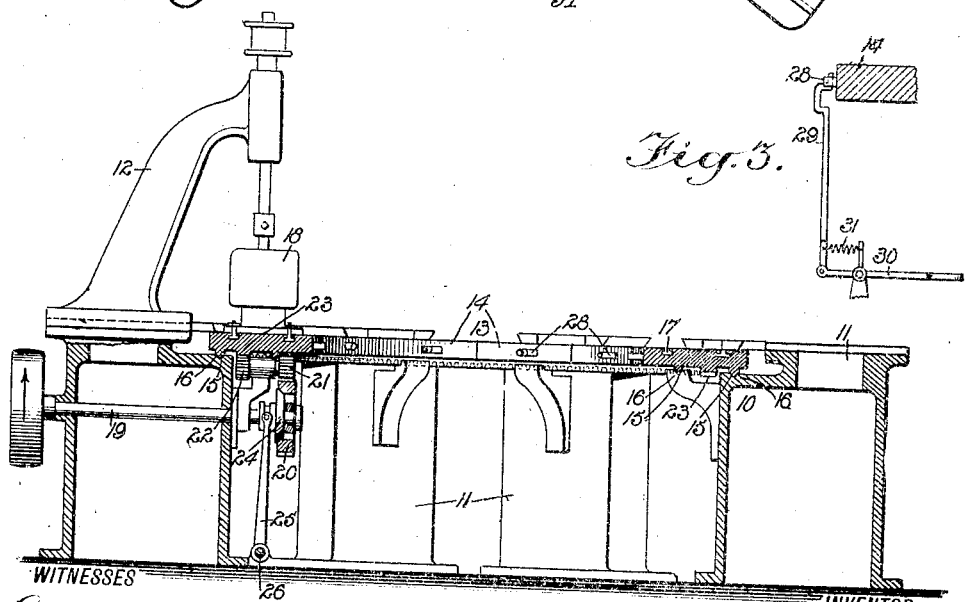
Fig. 2 is a vertical transverse section substantially on the line 2—2 of Fig. 1.

The multiple table for supporting a series of individual parts of machinery to be machined or treated, is shown as being of annular or hollow circular form indicated as a whole at 13 and comprising a continuous or endless circular series of table units 14 arranged end to end circumferentially and connected each to each in any suitable manner. These table units are provided with downwardly projecting annular ribs 15 which coöperate with grooves 16 formed in the stationary support, whereby the annular table is prevented from lateral or radial displacement. Each table unit is provided with dovetailed channels 17 of any suitable or conventional construction for the attachment of parts of machinery to be machined or operated upon, one of such parts being indicated at 18. By reference to Fig. 1, it will be noted that I preferably construct this apparatus making provision for eight machines and ten table units, a table unit being arranged directly adjacent to each machine and two table units to spare. By way of description of the operation, the first space or station is indicated at A, the second at B, which is opposite the first machine stand 11, the next then is C, and so on around to the last station which is marked L.

Station A will be understood as being the station at which an engine cylinder, for example, to be machined by various machines or processes will be clamped to the table unit 14 then directly opposite said station A. The multiple table as a whole will then be rotated through one step or from one station to another, bringing the job opposite the machine located at the first machine stand. While this job is being treated at the first machine, a second job or casting will be secured to the table unit, which at this time will be opposite the first station A. Thus the machine parts are applied in succession to all of the several table units 14 and brought in succession under or before the various machines located at the stands 11, under the control of any number of skilled machinists who may be stationed within the table circle or elsewhere. The first casting thus applied to the rotating table after having passed step by step beneath or along any desired number of machines, possibly eight as indicated, for the performance of as many different species of work thereon, will eventually come to the last station L where a helper will detach it and remove it from a table unit. The work of applying a new job at the station A will thus, it will be understood, be performed simultaneously with the operation of removing the finished job at the station L and also the treatment of the several intermediate jobs at the various stations between the first and the last. The value of this device in large machine shops or factories where internal combustion engines or the like are manufactured in large quantities according to standard specifications, will be duly appreciated.

Any suitable means may be provided to rotate the annular table step by step from one station to another according to the time required for the various functions to be performed at the several stations. I indicate for this purpose a power shaft 19, upon the inner end of which is loosely mounted a tooth gear 20 meshing with a pinion 21 secured to a short shaft carrying at its other end a beveled pinion 22 meshing with a large circular rack 23 formed on the lower surface of the annular table or series of table units concentric with the apparatus as a whole. The gear 20 is adapted to be connected periodically with the power shaft 19 through a friction clutch 24 manipulated by a lever 25 connected to a rock shaft 26 adjacent to the floor of the shop. A hand lever 27 projects upwardly for manipulation of any one of the operators for setting the clutch.

Each table unit carries a stop lug 28, with which a movable stop device 29 is adapted to coöperate for the purpose of stopping the table unit, having the then active stop lug opposite the first machine stand. The stop device 29 is indicated as being under the control of an operator's foot at the lever 30. When the treadle 30 is depressed, the stop device or arm 29 moves upwardly or otherwise away from the lug 28 permitting the table as a whole to rotate from one station to another when the power is connected through the clutch. The stop arm 29 then drops automatically either by gravity or by action of a spring 31 so as to stand in the path of the next succeeding lug 28, whereby the table is positively stopped. At the completion of the next step by step movement, the friction clutch connection between the power shaft and the machine table insures that no damage will result if the starting operator fails to release the connection at the exact instant that the stop mechanism becomes effective.

I claim:

In an apparatus of the character set forth, the combination of an annular series of machine stands, the first and last members of the series being spaced farther from each other than any other adjacent two of the stands, providing free space for operators, an annular series of table units movable step by step periodically along said stands, one table unit for each stand, and additional table units being opposite the wide space aforesaid for the application of work to or removal of work from such units, there being space provided within the series of table units for workmen opposite the respective machine stands, and power devices to operate the series of table units step by step from one station to another along said machine stands.

ROBERT S. ARRANTS.

Witnesses:
G. C. CALDIRON,
C. C. WHITE.